(12) United States Patent
Lau (10) Patent No.: US 8,712,234 B1
(45) Date of Patent: Apr. 29, 2014

(54) COMPACT LIGHT SHIELD FOR FLASH PHOTOGRAPHY

(71) Applicant: Ken M. Lau, Pacifica, CA (US)

(72) Inventor: Ken M. Lau, Pacifica, CA (US)

( * ) Notice: Subject to any disclaimer, the term of this patent is extended or adjusted under 35 U.S.C. 154(b) by 0 days.

(21) Appl. No.: 13/687,286

(22) Filed: Nov. 28, 2012

(51) Int. Cl.
*G03B 11/00* (2006.01)
*F21V 17/00* (2006.01)

(52) U.S. Cl.
CPC ............................ *F21V 17/00* (2013.01)
USPC ........................................................ 396/544

(58) Field of Classification Search
CPC ................................. F21V 17/00; F21V 17/04
USPC ........................................................ 396/544
See application file for complete search history.

(56) References Cited

U.S. PATENT DOCUMENTS

| | | | |
|---|---|---|---|
| 923,655 | A | 6/1909 | Hough et al. |
| D167,816 | S | 9/1952 | Steeber |
| 4,531,180 | A | 7/1985 | Hernandez |
| 4,947,303 | A | 8/1990 | Gordin et al. |
| D398,415 | S | 9/1998 | Markee |
| 5,839,006 | A * | 11/1998 | Beckerman ............... 396/174 |
| D432,693 | S * | 10/2000 | Wachter et al. ............. D26/63 |
| 7,360,909 | B1 * | 4/2008 | Hughes ....................... 362/18 |
| D583,500 | S | 12/2008 | Gordin |
| 7,918,588 | B2 | 4/2011 | Gordin et al. |
| 8,201,955 | B2 * | 6/2012 | Fong ............................ 362/18 |

OTHER PUBLICATIONS

Neil Van Niekerk, the black foamie thing, Nov. 21, 2009, http://neilvn.com/tangents/2009/11/21/the-black-foamie-thing/, Wayne, NJ.
Honl, David, HonlPhoto Speed Gobo, Mar. 2008, http://www.amazon.com/HonlPhoto-Speed-Barndoor-Bounce-Flashes/dp/B000XB9GUG/, Los Angeles, CA.
Honl, David, HonlPhoto 8-inch Regular Speed Snoot, Apr. 2008, http://www.amazon.com/HonlPhoto-Regular-Speed-Snoot-Shoe-Mount/dp/B000XB44121, Los Angeles, CA.
Expoimaging, Inc., Rogue FlashBenders, Sep. 2011, http://www.amazon.com/Rogue-FlashBenders-ROGUEFLAG-Bounce-Card/dp/B003UOKLJI/, Watsonville, CA.
HD Photovideo Inc., SpinLight 360, Feb. 2012, http://www.spinlight360.com/shop/, Edgewater, NJ.
Peter Gregg LLC, ABetterBounceCard, Aug. 2011, http://www.abetterbouncecard.com/abetterbouncecard-eyeshield.html, Miami, FL.

* cited by examiner

*Primary Examiner* — Clayton E LaBalle
*Assistant Examiner* — Dennis Hancock
(74) *Attorney, Agent, or Firm* — David Pressman (57) ABSTRACT

A compact light shield for flash photography (800) comprises a bib-shaped barrier (805) with a pair of arms (810, 815) with end slots (820, 825), a band (500) with end slots (520, 525), and a plurality of H&L fasteners (505, 510, 515, 830, and 1200). One fastener (1200) is affixed to a flash (1100). The barrier can be stored flat and can be rolled into and held in a scoop shape by interlocking its arm slots. The band is formed and held in a circular shape by interlocking its end slots. The band is secured to the barrier and both are oriented with the bib-shaped part facing away from and secured to the flash. An alternative embodiment eliminates the band and secures the barrier directly to the flash.

18 Claims, 7 Drawing Sheets

Fig. 3. PRIOR ART--WITHOUT LIGHT SHIELD-SIDE VIEW

Fig. 4. PRIOR ART--WITHOUT LIGHT SHIELD--REAR VIEW

SIDE VIEW

Fig. 17

REAR VIEW

Fig. 18

COMPACT LIGHT SHIELD FOR FLASH PHOTOGRAPHY

PRIOR ART

Figure 1:
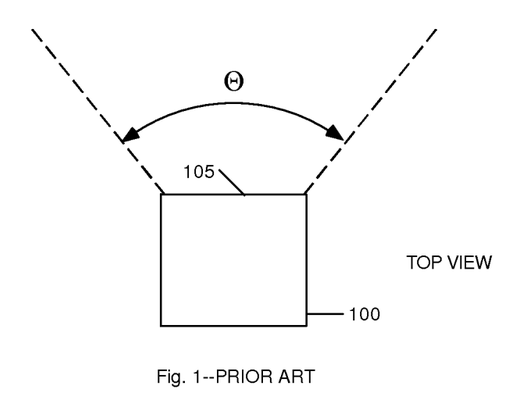
FIGS. 1 and 2 are top and side views of a prior-art flash unit and its light pattern output.
Figure 2:
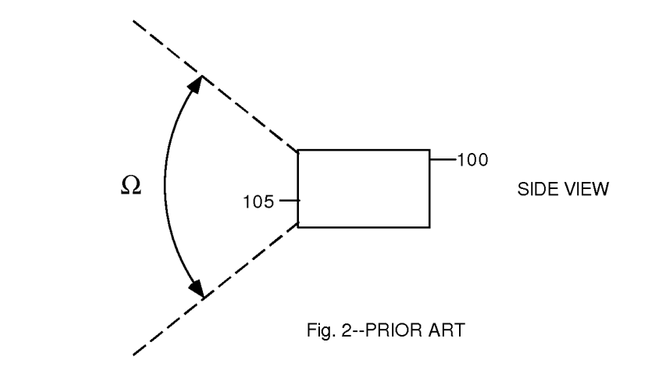

No Light Shield—FIGS. 1 and 2

Photographers have long used flash photography to illuminate subjects. The flash provided a directed, small, bright light source that produced high-contrast images.

FIGS. 1 and 2 show top and side views, respectively, of a standard, prior-art photoflash unit 100. When flash 100 is triggered by a camera or other means, light is emitted from a front surface 105 of the unit. The light was dispersed over a predetermined angular range, indicated by dashed lines in FIGS. 1 and 2. FIG. 1 shows the horizontal dispersion of light over an angle θ, centered about the normal to front surface 105 of the flash unit. FIG. 2 shows the up-down dispersion of light over an angle Ω.

Figure 3:
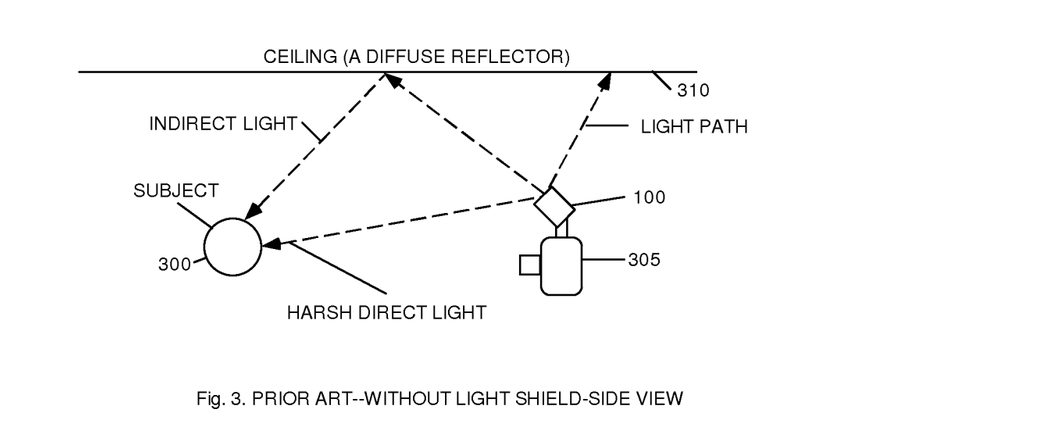
FIGS. 3 and 4 are side and rear views of a prior-art photographic setup that illuminates a subject using both direct and indirect light from a flash unit.
Figure 4:
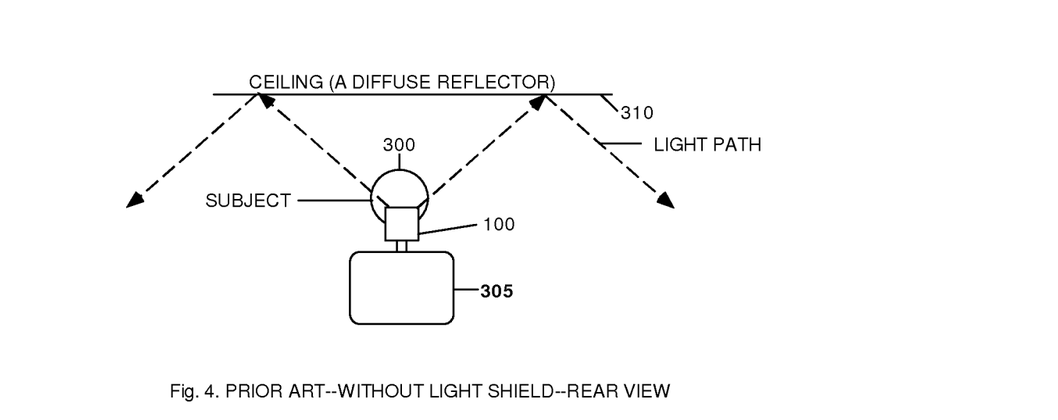

FIGS. 3 and 4 respectively show side and rear views of a typical, prior-art photographic setup that illuminates a subject 300 using both direct and indirect light from a flash 100. Lighting with this photographic technique is called "bounce flash" photography. Flash unit 100 is mounted on a camera 305. FIG. 3 shows unit 100 tilted so that a first portion of the light strikes a ceiling 310 and a second portion of the light strikes subject 300 directly. A third portion of the light either strikes other objects in the room or the walls where it is reflected or absorbed, or is lost. FIG. 4 shows the light path as it is seen from behind the camera.

The setup in FIGS. 3 and 4 illuminates the subject partly with harsh, direct light and partly with light reflected from ceiling 310. The direct light creates harsh, hard-edged shadows that are unappealing.

SUMMARY

I have discovered a light shield that overcomes the deficiencies of the prior-art. No direct light strikes the subject. The combination of my shield and the flash unit illuminates the subject with a bright, indirect light that emanates from a large, diffuse source. The result is a pleasing photograph with smooth light-to-dark gradients and no harsh shadows.

I obtain more pleasing lighting effects by avoiding the use of bright, directed light emanating from a small source, i.e., the flash unit. Instead, part or all of the light from the flash is reflected from a ceiling above and adjacent the subject and light is blocked from striking the subject directly. Unless mirrored, ceilings provide a diffuse reflector that scatters light in all directions. When this happens, the ceiling becomes a large, diffuse light source. Instead of harsh shadows, the picture of the subject has smooth gradients between dark and light areas.

In one aspect of a first embodiment, the light shield comprises a linear band having slots at its ends and removable fasteners at predetermined locations on both sides, and a shield portion comprising a bib-shaped part with two arms extending therefrom, each arm also including slots and removable fasteners. The shield portion can be stored flat. When ready for use, the band is formed into a circle and secured in that configuration by interlocking its slots. Then the shield portion is formed into a scoop shape and secured in that configuration by interlocking its slots. The band and shield portion are then secured together by joining their respective removable fasteners. A removable fastener is also affixed to the flash unit. The band and shield portion is secured to the flash unit by joining the fastener within the circular band with the fastener attached to the flash unit.

FIRST EMBODIMENT

Light Shield for Bounce Flash Photography—Assembly—FIGS. 5 to 14

In a first embodiment, a barrier prevents light from the flash unit from striking the subject directly. Instead, the barrier directs as much light as possible from the flash unit to the ceiling above the subject.

Figure 8:
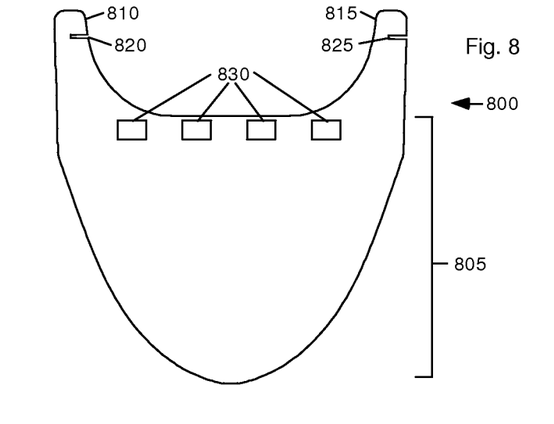
FIG. 8 shows the barrier in its flattened condition, suitable for storage

FIGS. 5 through 10 show the assembly where a light shield comprises two parts: a band 500 (FIGS. 5 and 6) and a barrier or shielding portion 800 (FIG. 8).

Figure 5:
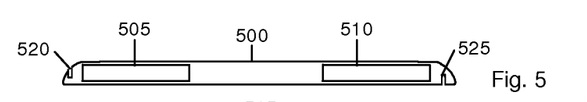
FIGS. 5 and 6 are front and rear views of a band used to attach a barrier to a flash unit.
Figure 6:
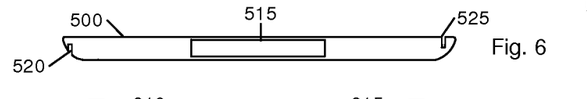

Band:

FIGS. 5 and 6 show front and rear views, respectively, of band 500; the band is used to attach barrier 800 (FIG. 8) to the shield. Band 500 (FIGS. 5 and 6) is shown in its flat condition prior to assembly, suitable for storage. Its front side includes two spaced loop portions of hook-and-loop (H&L) fasteners 505 and 510. Fasteners 505 and 510 can be called barrier connectors because they are used to attach band 500 to the shield of FIG. 8, as will be described. The rear side of the band includes a hook portion of a hook-and-loop fastener 515. Fastener 515 can be called an object or flash-unit connector because it is used to attach band 500 to the flash unit of FIG. 8, as will be described. Fasteners 505, 510, and 515 can be replaced by fewer or more fastener sections and these can have different positions than as shown. Band 500 further includes a pair of slits 520 and 525 near its ends.

Figure 7:
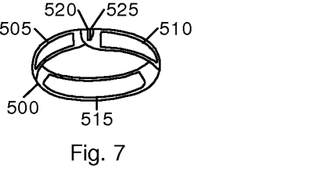
FIG. 7 shows the band formed into a circular shape.

FIG. 7 shows band 500 prepared for use. Band 500 is formed into a circular shape and slits 520 and 525 are inserted into one-another to hold band 500 in this configuration.

Barrier:

FIG. 8 shows barrier 800 in its flattened condition, suitable for storage. As stated, band 500 (FIGS. 5 and 6) is used to attach barrier 800 to the flash unit. Barrier 800 comprises a lower, bib-shaped part 805 from which two arms 810 and 815 extend upwardly. Arms 810 and 815 further contain slits 820 and 825 near their upper, free ends. One or more hook portions of H&L fasteners 830 are affixed to barrier 800 at the upper end of bib part 805. Fasteners 830 can be called band connectors because they are used to attach the barrier to the band of FIGS. 5 and 6, as will be described.

When flat, barrier 800 in one embodiment was 30 cm wide at its widest point. Other dimensions scale as shown in the drawings. Barrier 800 and band 500 can be made of construction paper, flexible foam, metal, plastic, or a composite material. Barrier 800 can be dark or light, have a high or low reflectivity, be translucent or opaque, and be textured or smooth or a combination of any or all of these properties, as required for the desired lighting effect. Barrier 800 can be cut from a flat sheet or thermoformed or vacuum formed.

Figures 9, 10:
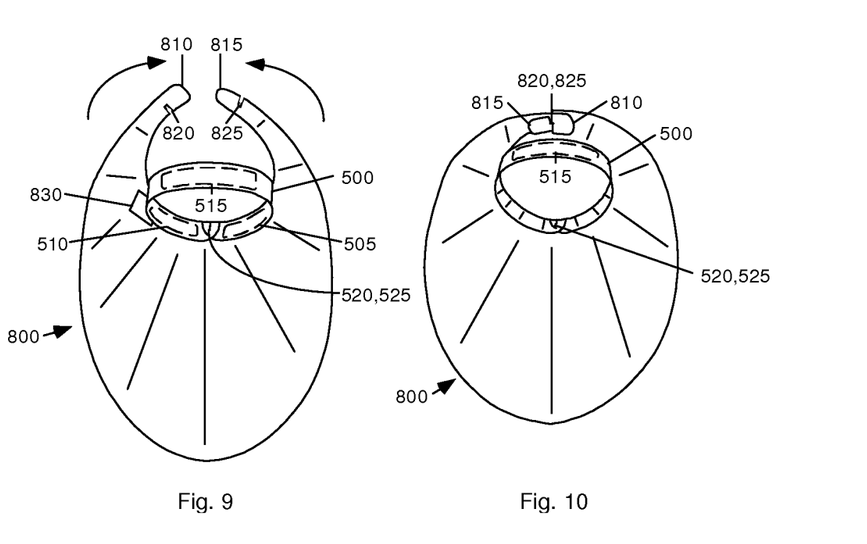
FIG. 9 shows the band attached to the barrier.
FIG. 10 shows the barrier formed into a scoop-like shape assembled with the band to form a light shield for attachment to a flash unit.

Attachment of Band to Barrier:

FIG. 9 shows band 500 attached to barrier 800. Shield fasteners 510 and 505 on band 500 are secured to mating band fasteners 830 on barrier 800. As shown the left two of fasteners 830 on barrier 800 are attached to fastener 505 on band 500 and the right two of fasteners 830 are attached to fastener 510. Arms 810 and 815 are then brought together by lifting them so that barrier 800 forms an elongated circular shape around band 500.

FIG. 10 shows completion of the assembly of barrier 800 and band 500. Arms 810 and 815 are overlapped and slits 820 and 825 are inserted into one-another, thereby securing barrier 800 in a scoop-like shape.

Figure 11:
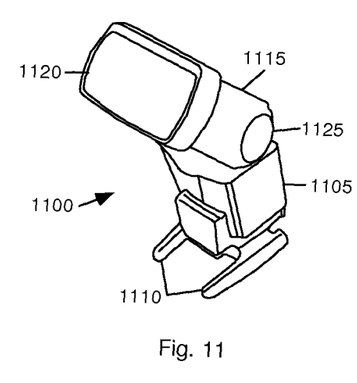
FIGS. 11 and 12 show a flash unit and the flash unit with a hook-and-loop fastener secured to the flash unit.

Next, the band-and-shield assembly of FIG. 10 is secured to a flash unit. FIG. 11 shows a standard flash unit 1100. Flash 1100 comprises a lower part 1105 that rests on a pair of feet 1110. Part 1105 typically contains batteries (not shown) or a connection to an external power source (not shown). At the upper end of part 1105, an adjustable tilt part 1115 contains a flash bulb (not shown) that emits light through an opening 1120. Part 1115 can be adjustably rotated about a pivot 1125.

Figure 12:
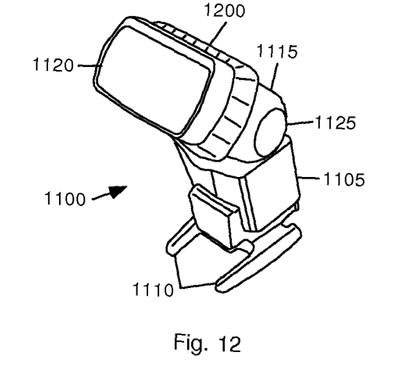

FIG. 12 shows the assembly of FIG. 11, together with a loop part 1200 of an H&L fastener or band connector. Part 1200 is secured to tilt portion 1115 behind opening 1120, as shown, using double-stick adhesive or another means, such as one or more rivets or screws, rubber band or tension bands with hook-and-loop fasteners, magnetic strips, and the like.

Figure 13:
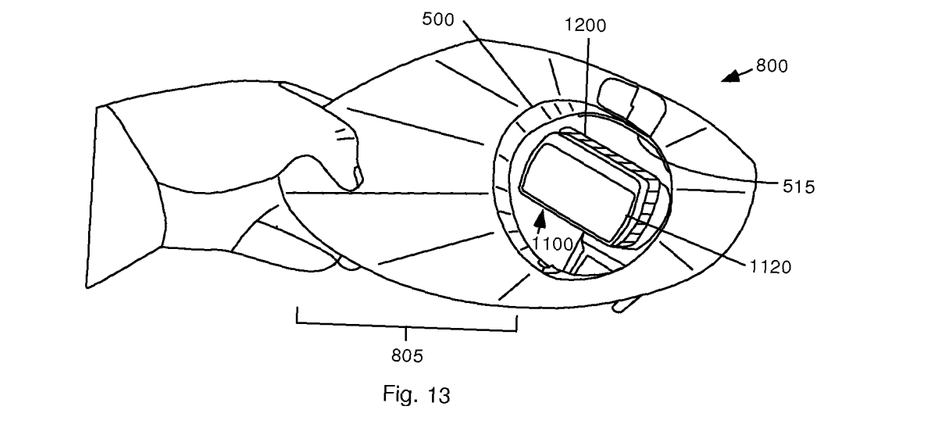
FIG. 13 is a front view showing the insertion of the flash unit into an opening formed by the band and the barrier of FIG. 10.

Assembling the Band, Barrier, and Flash:

FIG. 13 is a front view showing the insertion of flash 1100 into the opening formed by band 500. Opening 1120 of flash 1100 faces bib part 805 of barrier 800. H&L portion 515 of the band is positioned directly over H&L part 1200 of flash 1100 and H&L part 515 is urged against H&L part 1200, thereby fastening band 500 and barrier 800 securely to flash 1100.

Figure 14:
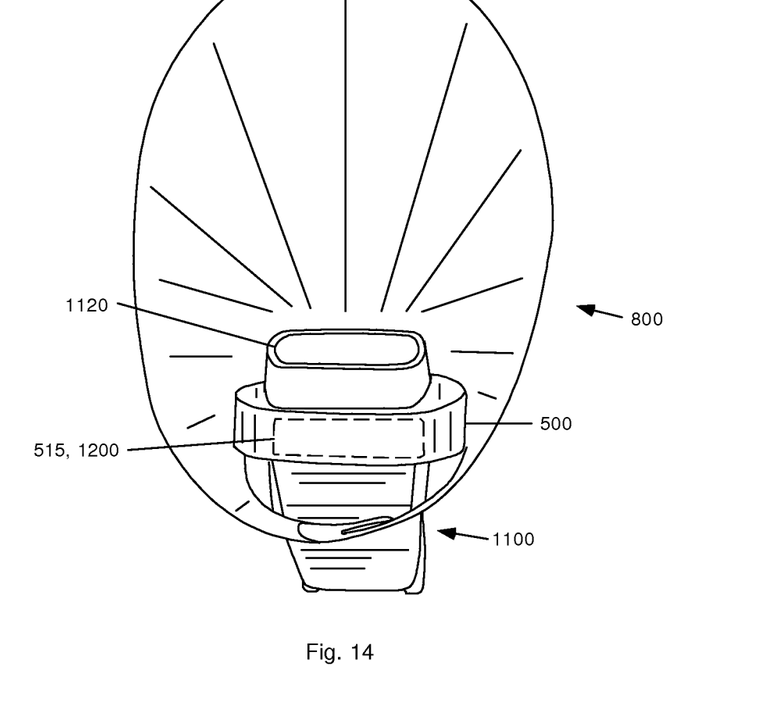
FIG. 14 is a top view that shows the light shield, ready for use.

FIG. 14 is a top view that shows the completely assembled light shield, ready for use.

ALTERNATIVE EMBODIMENT

Figure 15:
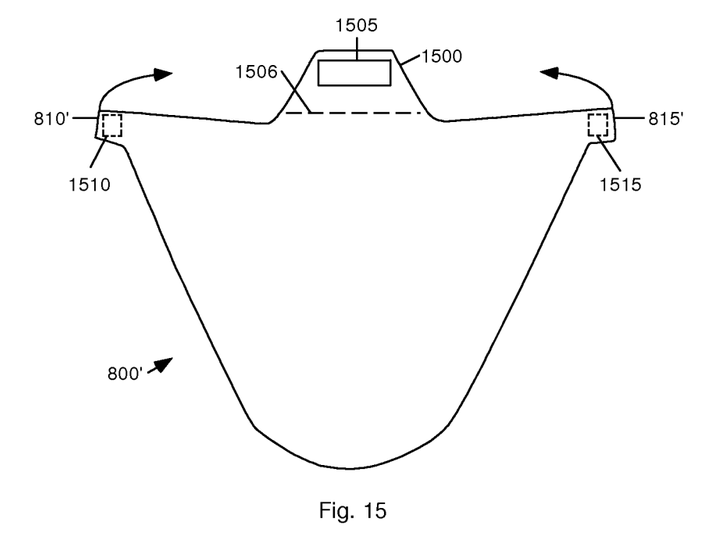
FIG. 15 shows an alternative light shield in its flattened condition.
Figure 16:
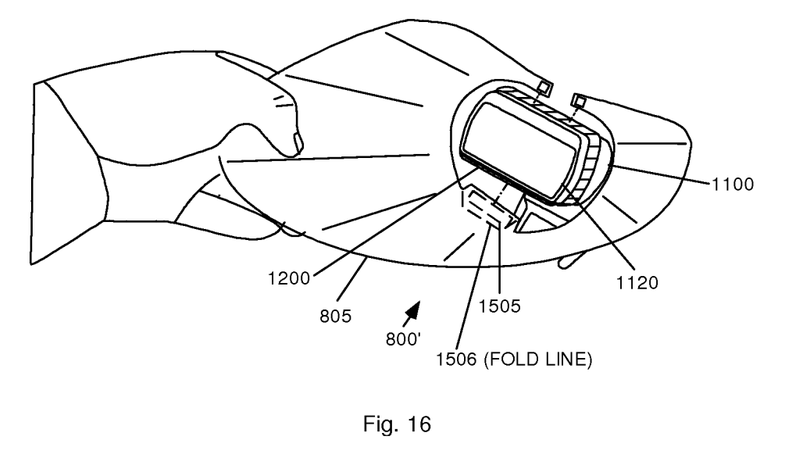
FIG. 16 shows the alternative light shield positioned over the flash unit.

FIGS. 15 and 16

In an alternative embodiment (FIGS. 15 and 16), band 500 (FIGS. 7 through 14) is eliminated. FIG. 15 shows an alternative barrier 800' in its flattened condition with a tongue or tab 1500 extending away from the center of the top of the barrier. A single hook part 1505 of a H&L fastener is affixed to tab 1500. The tongue has a fold line 1506 across its base, where it extends from the rest of the shield.

Arms 810' and 815' extend from opposite sides of the upper end of the barrier on each side of tongue or tab 1500. These arms are shorter than arms 810 and 815 of the barrier of FIG. 8 and extend to the sides of the barrier rather than upwardly, for reasons to be explained. A pair of hook parts of H&L fasteners 1510 and 1515 are secured to arms 810' and 815' on the side opposite hook part 1505, as shown.

Assembly

FIG. 16 shows barrier 800' positioned over flash unit 1100 with flash opening 1120 projecting toward bib part 805 of barrier 800', as described above in connection with the first embodiment. The user folds barrier 800' along fold line 1506, urges fastener part 1505 upward and presses it firmly against fastener part 1200 on the underside of flash unit 1100, thereby securing tongue 1500 to flash unit 1100. Next, arms 810' and 815' are urged together as shown by arrows (FIG. 15) and fasteners 1510 and 1515 are pressed against the loop part of fastener 1200 (FIG. 16). The shortness and side directions of the arms enable them to be attached directly to the flash unit, rather than to each other as in the previous embodiment. Barrier 800' is now ready for use.

In the descriptions above, the relative positions of the hook portion and loop parts of the H&L fasteners can be exchanged, i.e., hook parts can replace loop parts and vice versa. Instead of H&L fasteners, adhesive tape or other fasteners, such as screws, rivets, rubber bands, or tension bands with H&L fasteners, magnetic strips, and the like can be used.

Figure 17:
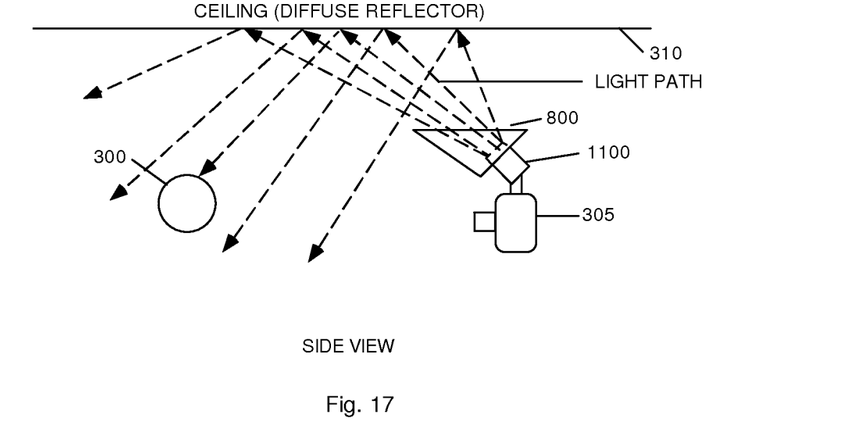
FIGS. 17 and 18 show side and rear views of the light shield in use and illustrating how light from the shield is directed to a ceiling and then to the subject.
Figure 18:
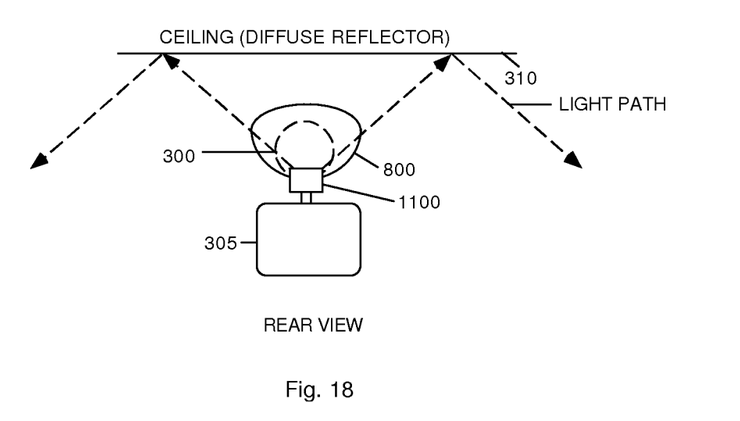

Light Shield for Bounce Flash Photography—Operation—FIGS. 17 and 18

FIGS. 17 and 18 show my light shield in use. Barrier 800 or 800' is affixed to flash unit 1100, which is mounted on a camera 305. However it can be located elsewhere and operated as a slave flash. The benefits achieved can be seen by comparing side views FIGS. 3 and 17 of the photographic arrangement with rear views FIGS. 4 and 18. Without barrier 800 (FIGS. 3 and 4), harsh, direct light from flash 1100 strikes subject 300. With barrier 800 (FIGS. 17 and 18) the barrier blocks the light from the flash that otherwise would shine directly on subject 300. The barrier can either be (a) black so as to absorb and thereby block the light that would otherwise shine directly on the subject, (b) reflective (e.g., silver, white, etc.) so as to reflect and thereby divert most of the light that would otherwise shine directly on the subject so that the reflected light bounces off the ceiling or walls and provides diffuse light on the subject, or (c) partly reflective and partly absorbing (e.g., an intermediate partially reflective color such as gray or part silvered and part black) to absorb some of the light and reflect some of the light that would otherwise shine directly on the subject. In case (b) very little light will be wasted and subject 300 will be illuminated with a large area of diffuse light reflected from ceiling 310. In all cases the barrier will cause the flash unit to provide softer, more pleasing illumination, as stated above.

CONCLUSION, RAMIFICATIONS, AND SCOPE

My light shield illuminates a subject with a large area of diffuse light while preventing direct illumination of the subject by the flash unit. The diffuse light is reflected from a ceiling above and between the camera and subject. The result is a pleasing photographic image that contains smooth light-to-dark gradients and no harsh shadows. The shield is simple in construction, economical to make, and simple to install.

While the above description contains many specificities, these should not be construed as limitations on the scope, but as exemplifications of some present embodiments. Many other ramifications and variations are possible within the teachings. For example, the materials and sizes can be changed, as can the shapes of the components. The light shield is applicable to a wide variety of sizes and shapes of flash units, including oval, rectangular, square, hexagonal and other shaped units. All components can be made in one or more colors for decorative effects. The barrier can be longer or shorter, as required. Instead of being oriented horizontally, the barrier can be tilted at various angles. Instead of a ceiling, the barrier can be arranged to direct light from the flash to a wall or floor. The connection slots at the ends of the band and the arms of the barrier can be replaced with other types of connectors, such as a buckle, a snap, H&L fasteners, clots with catches, etc. The barrier can have a reflective surface that is white or mirrored to reflect more light away from the subject.

The invention claimed is:

1. A compact light shield for use with a photographic flash unit, comprising:
   an elongated band having connectors at its ends to that said ends can be removably attached together,
   said elongated band having an object connector on one side thereof so that said band can be removably attached to an object and a shield connector on the other side thereof so that said band can be removably attached to a shield portion,
   a shield portion comprising a bib portion with two arms extending therefrom, each of said arms further including a connector near its free end so that said ends can be attached together,
   said shield portion further including a band connector at a predetermined location so that said shield portion can be removably attached to said shield connector on said band,
   said band being formable into a circular shape and being retainable in that configuration by attaching said connectors on said ends of said band together,
   said shield portion being formable into a scoop shape and being retainable in that configuration by attaching said connectors on said ends of said arms together,
   said shield connector on said band being removably securable to said connector on said shield portion so that said band can be removably secured to said shield portion,
   said band being removably securable to a flash unit by joining said object connector on said band to a mating connector on said flash unit,
   whereby when said band is secured to said shield portion and said band is secured to said flash unit, said shield portion will also be removably secured to said flash unit and will block light from said flash unit from shining directly on a subject.

2. The compact light shield assembly of claim 1 wherein said connectors on said ends of said linear band or said shield portion comprise a mating pair of slots.

3. The light shield of claim 1 wherein said shield portion has a reflective surface for reflecting light from said flash unit to a ceiling or wall.

4. The compact light shield assembly of claim 1 wherein said object connector on said band is one part of a hook-and-loop fastener.

5. The compact light shield assembly of claim 1 wherein said shield connector on said band is one part of a hook-and-loop fastener and said band connector on said shield portion is a mating part of a hook-and-loop fastener.

6. The compact light shield assembly of claim 1 wherein said object connector and said shield connector on said band are each part of a hook-and-loop fastener.

7. The compact light shield assembly of claim 1 wherein said connectors on said ends of said linear band comprise a mating pair of slots, said connectors on said ends of said arms of said shield portion comprise a mating pair of slots, said shield connector on said band is one part of a hook-and-loop fastener and said band connector on said shield portion is a mating part of a hook-and-loop fastener.

8. A compact light shield for use with a photographic flash unit, comprising:
   a shield portion comprising a bib part with two arms extending from one end of said bib part, each of said arms further including a connector near its free end so that said ends can be attached to a flash unit,
   said shield portion being shaped so that it can be formed into a scoop shape and being retainable in that configuration when said connectors on said ends of said arms are fixed so said flash unit,
   said shield portion having a tongue or tab part extending from said one end of said bib part, said tongue or tab part having a connector attached to one end of said of said tongue or tab part, said connector being attachable to said flash unit for holding said shield thereto,
   whereby when said shield portion is formed into a scoop shape and retained in that configuration by attaching said connectors on said ends of said arms together, said shield portion can be removably secured to a mating connector on said flash unit and will block light from said flash unit from shining directly on a subject.

9. The compact light shield of claim 8 wherein said tongue or tab part has a fold line thereon.

10. The compact light shield of claim 8 wherein said connectors on the ends of said arms are hook-and-loop fasteners.

11. The compact light shield of claim 8 wherein said connector on the end of said tongue or tab part is one part of a hook-and-loop fastener.

12. The compact light shield of claim 8 wherein said connectors on the ends of said arms are hook-and-loop fasteners and said connector on the end of said tongue or tab part is one part of a hook-and-loop fastener.

13. The compact light shield of claim 8 wherein said shield has a reflective surface for reflecting light from said flash unit to a ceiling or wall.

14. A compact light shield for use with a photographic flash unit, comprising:
   a shield portion comprising a bib part with two arms extending therefrom,
   said shield portion being shaped so that it can be formed into a scoop shape,
   said shield portion having a connector on an end of each of its two arms so that said shield portion can be retained in said scoop-shaped configuration by coupling said connectors on said ends of said arms together,
   means for removably securing said shield portion to a flash unit after it is formed into said scoop shape, said means comprising an elongated band having connectors at its ends so that said ends of said band can be removably attached together, one side of said band having an object connector thereon so that said band can be removably attached to said flash unit, the other side of said band having a shield connector thereon so that said band can be removably attached to said shield, said connectors at said ends of said arms being arranged to attach said ends together, said shield portion having a band connector at a predetermined location thereon so that said shield portion can be removably attached to said shield connector on said band, whereby when said shield portion is secured to said band and said band is secured to said flash unit, said shield portion will block light from said flash unit from shining directly on a subject.

15. The light shield of claim 14 wherein said connectors on the ends of said arms of said band or said shield portion are mating slots.

16. The light shield of claim 14 wherein said shield has a reflective surface for reflecting light from said flash unit to a ceiling or wall.

17. The light shield of claim 14 wherein said connectors on said ends of said elongated band comprise a mating pair of slots, said connectors on said ends of said arms of said shield portion comprise a mating pair of slots, said shield connector on said band is one part of a hook-and-loop fastener, and said band connector on said shield portion is a mating part of a hook-and-loop fastener.

18. The light shield of claim 14 wherein said connectors on the ends of said arms of said band or said shield portion are hook-and-loop fasteners.

\* \* \* \* \*